(12) United States Patent
Niemi et al.

(10) Patent No.: US 7,887,267 B2
(45) Date of Patent: Feb. 15, 2011

(54) CUTTING INSERT FOR CHIP REMOVING MACHINING

(75) Inventors: Matti Niemi, Fagersta (SE); Kaj Virtanen, Fagersta (SE)

(73) Assignee: Seco Tools AB, Fagersta (SE)

( * ) Notice: Subject to any disclaimer, the term of this patent is extended or adjusted under 35 U.S.C. 154(b) by 342 days.

(21) Appl. No.: 12/324,917

(22) Filed: Nov. 28, 2008

(65) Prior Publication Data

US 2009/0142149 A1 Jun. 4, 2009

(30) Foreign Application Priority Data

Dec. 4, 2007 (SE) .................................. 0702674

(51) Int. Cl.
*B23B 27/04* (2006.01)
*B23B 27/08* (2006.01)

(52) U.S. Cl. ....................... 407/114; 407/117

(58) Field of Classification Search ................ 407/110, 407/113, 114, 115, 116, 117
See application file for complete search history.

(56) References Cited

U.S. PATENT DOCUMENTS

| | | | | |
|---|---|---|---|---|
| 4,957,396 A | * | 9/1990 | Niebauer | 407/114 |
| 4,992,008 A | * | 2/1991 | Pano | 407/114 |
| 5,704,737 A | * | 1/1998 | Alford | 407/114 |
| 5,836,723 A | * | 11/1998 | Von Haas et al. | 407/107 |
| 6,000,885 A | * | 12/1999 | Erickson | 407/113 |
| 6,648,560 B2 | * | 11/2003 | Andras | 407/109 |
| 7,275,896 B2 | * | 10/2007 | Nudelman | 407/114 |

FOREIGN PATENT DOCUMENTS

| EP | 0150901 A3 | 8/1985 |
|---|---|---|
| EP | 0416854 A1 | 3/1991 |

OTHER PUBLICATIONS

International Search Report for corresponding International Application PCT/SE2008/051373.

* cited by examiner

*Primary Examiner*—Will Fridie, Jr.
(74) *Attorney, Agent, or Firm*—WRB-IP LLP

(57) ABSTRACT

A cutting insert for chip removing machining is provided, the cutting insert including an elongate center part, cutting edges being arranged at the opposite ends of the center part, the cutting insert being provided with engagement members along two longitudinal, opposite sides, the cutting edges forming, in an end view of the cutting insert, a mutual angle ($\alpha$). A tool is also provided and includes such a cutting insert. The cutting insert includes rake faces associated with the respective cutting edge that are facing the opposite direction in the vertical direction (H) of the cutting insert, and the mutual angle ($\alpha$) is in the interval of $10°<\alpha<20°$, and a distance (H1) is measured between the intersection of the cutting edge with a center line (C1-C1) of the cutting insert and the outermost portion of the lower engagement member and in that in an end view of the cutting insert, the ratio between the distance (H1) and the height (H) of the cutting insert is the following: $0.5H \leq H1 \leq 0.7H$, the distance (H1) and the height being measured along a center line (C1-C1) of the cutting insert.

8 Claims, 5 Drawing Sheets

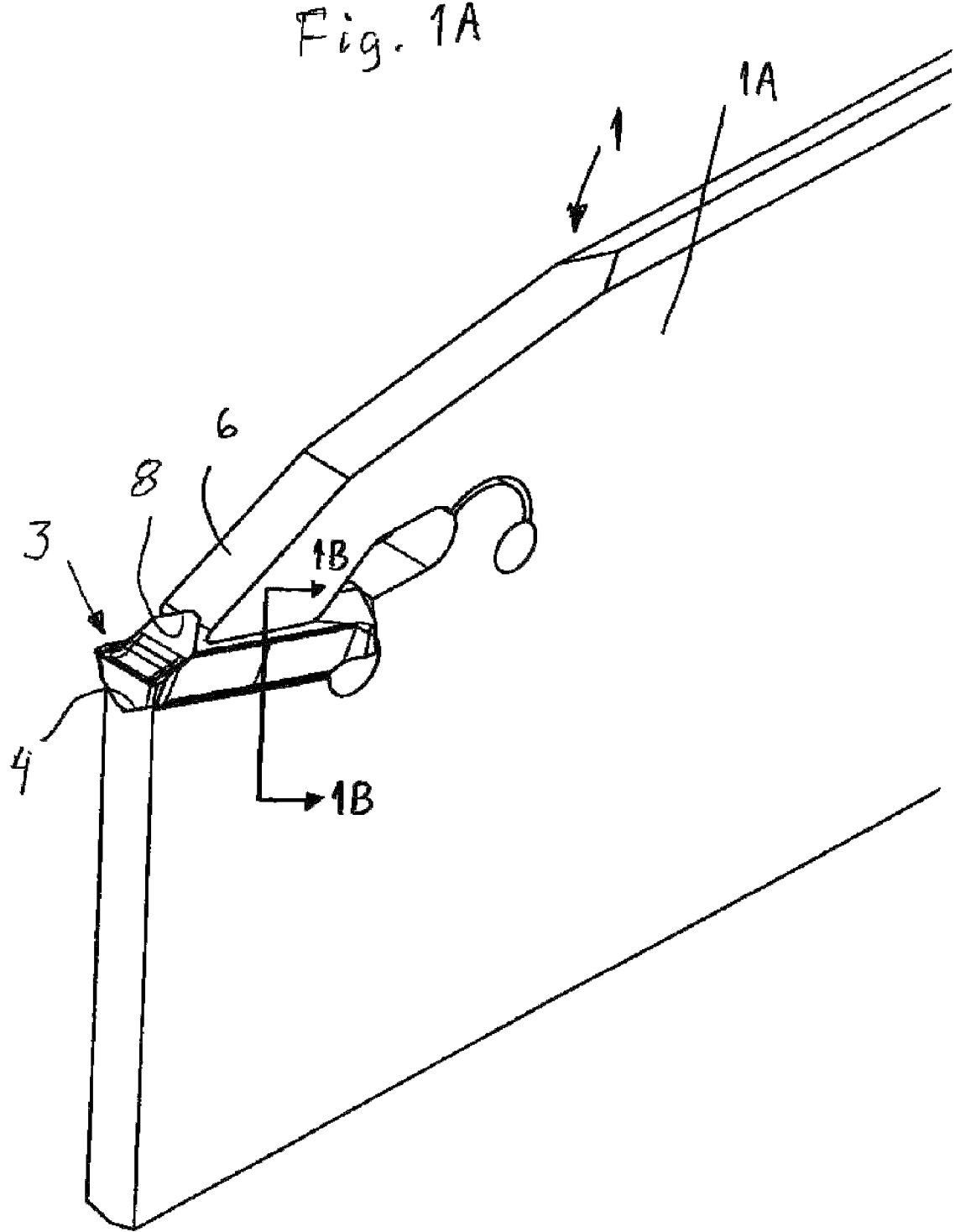

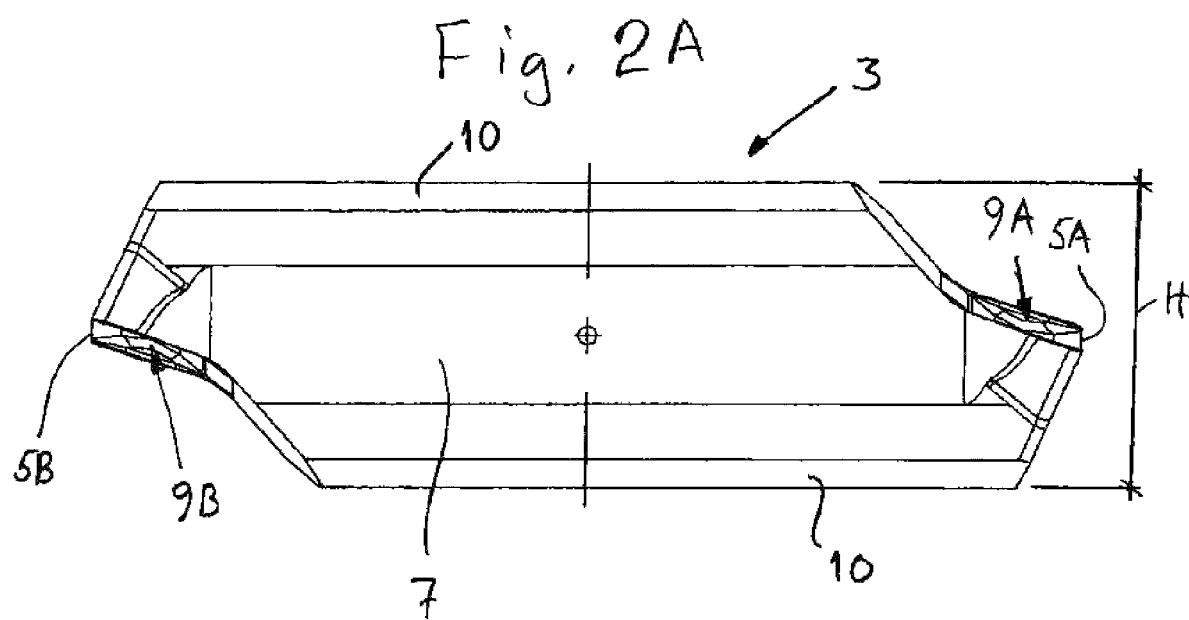

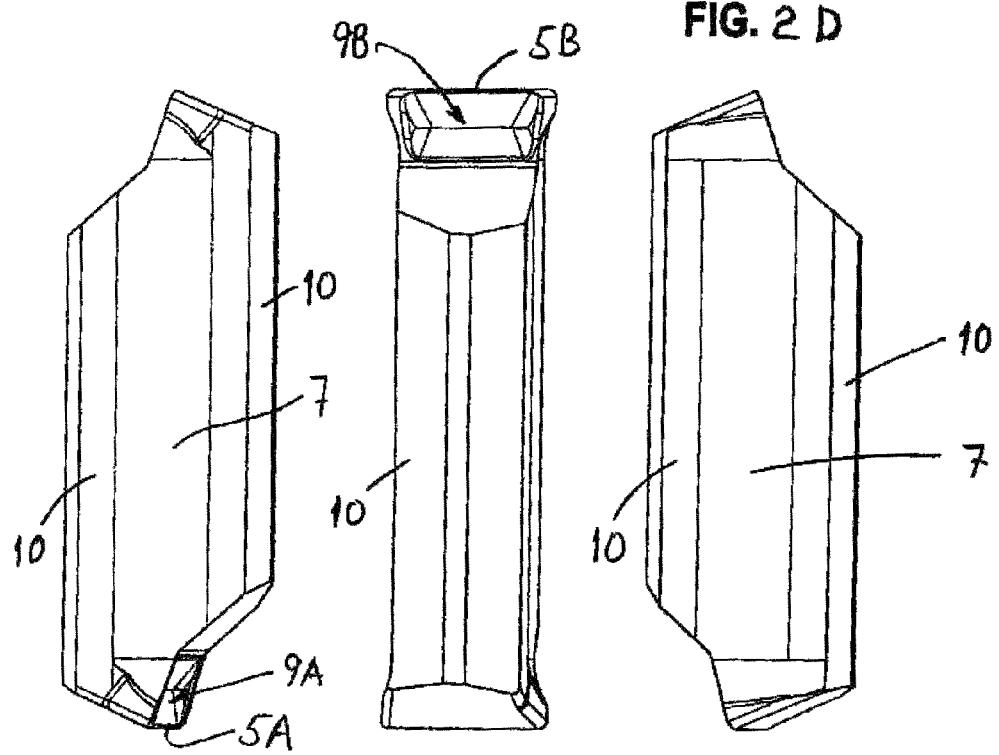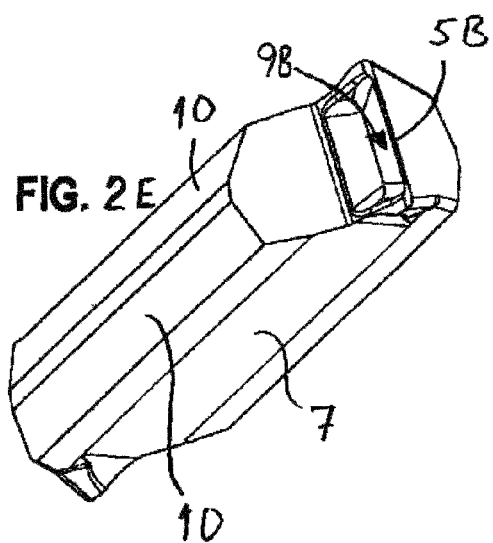

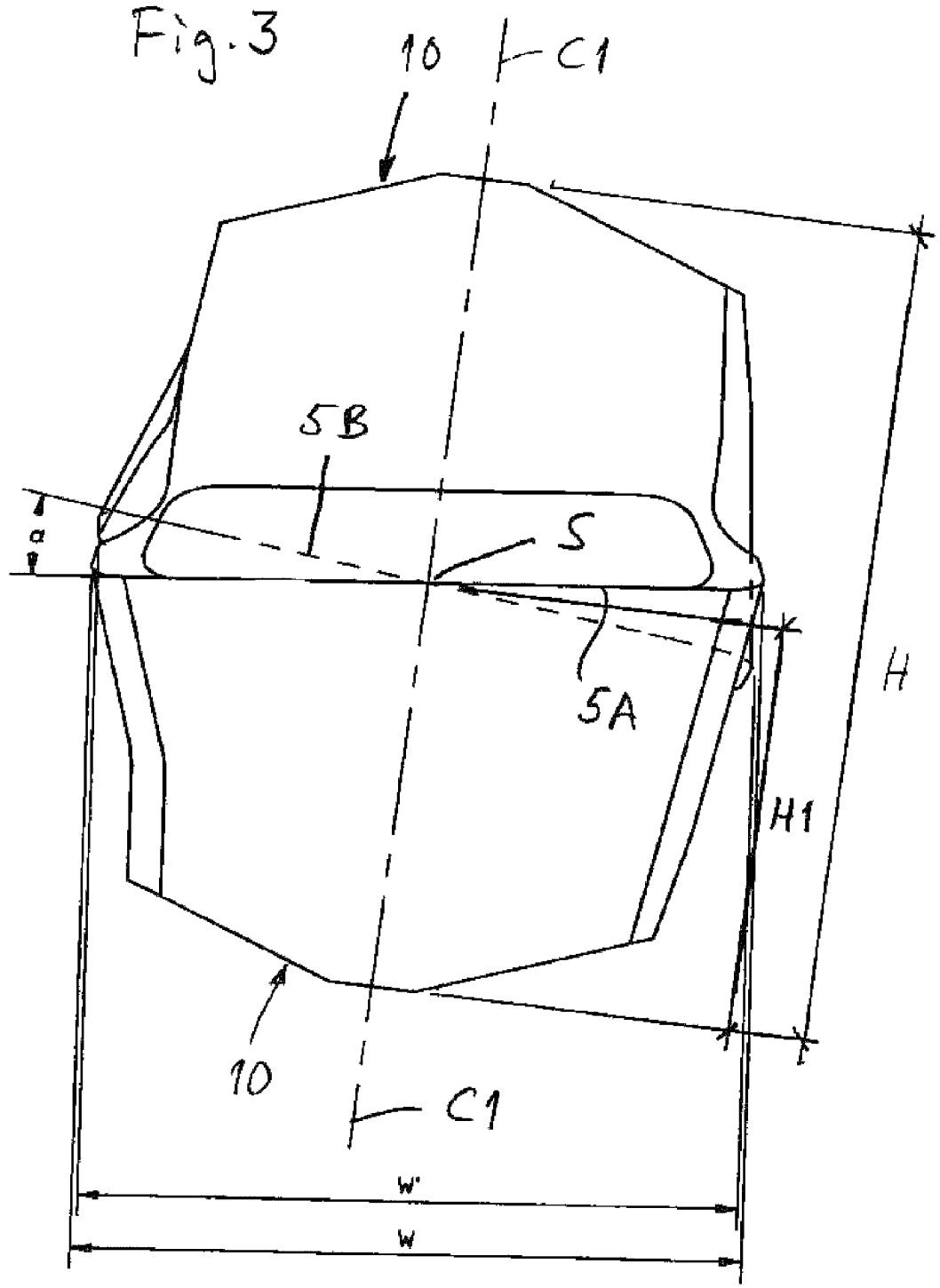

CUTTING INSERT FOR CHIP REMOVING MACHINING

BACKGROUND AND SUMMARY

The present invention relates to a cutting insert for chip removing machining, the cutting insert comprising an elongate center part, cutting edges being arranged at the opposite ends of the center part, and the cutting insert being provided with engagement members along two longitudinal, opposite sides, the cutting edges, in an end view of the cutting insert, forming a mutual angle. The present invention also relates to a tool, which comprises a cutting insert according to the present invention.

A cutting insert for chip removing machining is previously known through EP 0 416 854 B2, especially for axial turning of circular grooves. The cutting insert is received in a holder and has cutting edges in opposite ends. The cutting insert has a generally elongate shape and both the cutting edges are arranged on a longitudinal side. The cutting insert has grooves on opposite longitudinal sides and these grooves co-operate with ridges of the holder. The groove that is situated on the same side as the cutting edges is situated between the cutting edges. The cutting edges and the deepest part of the appurtenant groove are essentially situated at the same distance from the groove on the opposite side.

An additional cutting insert for chip removing machining is previously known through U.S. Pat. No. 6,648,560, the cutting edges provided at the opposite ends of the cutting insert being twisted 90° in relation to each other. By such an arrangement, the cutting edge that is inactive is twisted away in such a way that it is situated inside the groove that the active cutting edge generates. Still another cutting insert for chip removing machining is previously known through U.S. Pat. No. 5,836,723 showing cutting edges in one embodiment facing in opposite vertical directions.

It is desirable to provide a cutting insert of the kind defined by way of introduction, wherein the cutting insert can work in greater cutting depths than the total length thereof without a trailing cutting edge contacting the piece to be machined.

It is also desirable that the cutting insert according to the present invention should give a lower insert cost than cutting inserts having only one cutting edge.

It is still further desirable to increase the stability of the fastening of the cutting insert in the holder.

In a cutting insert for chip removing machining according to an aspect of the present invention, the cutting insert comprises an elongate center part, cutting edges being arranged at the opposite ends of the center part, the cutting insert being provided with engagement members along two longitudinal, opposite sides, the cutting edges forming, in an end view of the cutting insert, a mutual angle ($\alpha$), wherein rake faces associated with the respective cutting edge are facing opposite directions in the vertical direction of the cutting insert, and the angle ($\alpha$) between the cutting edges is in the interval of $10°<\alpha<20°$, a distance (H1) being measured between the intersection of the cutting edge with a center line (C1-C1) of the cutting insert and the outermost portion of the lower engagement member and in that in an end view of the cutting insert, the ratio between the distance (H1) and the height (H) of the cutting insert is the following: $0.5H \leq H1 \leq 0.7H$, the distance (H1) and the height being measured along a center line (C1-C1) of the cutting insert.

In a tool for chip removing machining according to another aspect of the present invention, the tool comprises a disc-shaped holder as well as a cutting insert received in the holder, the cutting insert comprising an elongate center part, cutting edges being arranged at the opposite ends of the center part, the cutting insert being provided with engagement members along two longitudinal, opposite sides, the cutting edges forming, in an end view of the cutting insert, a mutual angle ($\alpha$), wherein the rake faces associated with the respective cutting edge are facing the opposite direction in the vertical direction of the cutting insert, the angle ($\alpha$) between the cutting edges is in the interval of $10°<\alpha<20°$, a distance (H1) being measured between the intersection of the cutting edge with a center line (C1-C1) of the cutting insert and the outermost portion of the lower engagement member and in an end view of the cutting insert the ratio between the distance (H1) and the height (H) of the cutting insert is the following: $0.5H \leq H1 \leq 0.7H$, the distance (H1) and the height being measured along a center line (C-C) of the cutting insert.

BRIEF DESCRIPTION OF THE DRAWINGS

Below, an embodiment of the invention will be described, reference being made to the accompanying drawings, where:

FIG. 1A shows a perspective view of a tool according to the present invention, the tool comprising a cutting insert according to the present invention;

FIG. 2A shows a side view of the cutting insert according to the present invention shown in FIG. 1, a symmetry plane for the cutting insert being situated parallel with the plane of the paper;

FIG. 2B shows a planar view of the cutting insert according to the present invention, one cutting edge of the cutting insert being situated parallel with the plane of the paper;

FIG. 2C shows a side view from the right of the cutting insert according to FIG. 2B;

FIG. 2D shows a side view from the left of the cutting insert according to FIG. 2B;

FIG. 2E shows a perspective view of the cutting insert according to the present invention; and FIG. 3 shows an end view of the cutting insert according to FIGS. 2B and 2C.

DETAILED DESCRIPTION

Figure 1B:
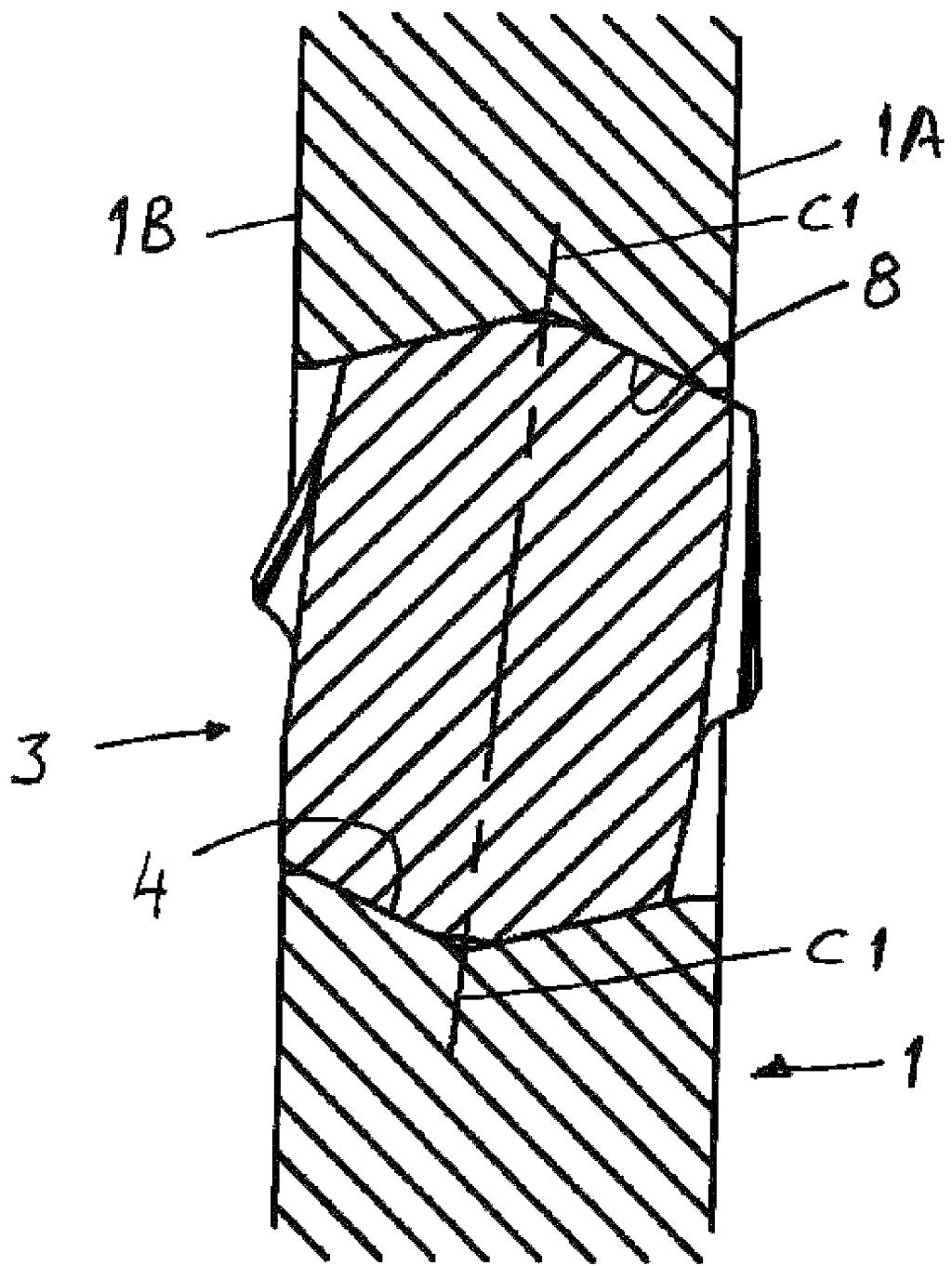
FIG. 1B shows a cross-section according to the line 1B-1B in FIG. 1A.

The tool according to the present invention shown in FIGS. 1A and 1B comprises a disc-shaped holder 1 having plane-parallel side surfaces 1A, 1B as well as a cutting insert 3 received in the holder 1 for chip removing machining. The holder is provided with a first groove 4 as well as a clamp 6, which is provided with a second groove 8. When the cutting insert 3 is received in the holder 1, it is clamped in an insert pocket between the first groove 4 and the second groove 8 of the clamp 6.

The cutting insert 3 is generally elongate as well as provided with cutting edges 5A and 5B, respectively, at the opposite ends thereof. The height of the cutting insert 3 is designated H in FIGS. 2A and 3. In FIGS. 1B and 3, a center line C1-C1 of the cutting insert 3 is drawn in the shown section/end view of the cutting insert 3. As is seen in FIGS. 2A-D, the cutting insert 3 has a center part 7, which extends essentially along the entire length of the cutting insert 3, the ends of the center part 7 being provided with cutting edges 5A, 5B. The mutual orientation of the cutting edges 5A, 5B is such that, as seen in the vertical direction of the cutting insert 3, the rake face 9A associated with one of the cutting edges 5A is facing the opposite direction in comparison with the rake face 9B associated with the second cutting edge 5B. An exceptionally important feature of the cutting insert 3 according to the present invention is that the cutting edges 5A and 5B are sloping in relation to each other, i.e., in an end view of the cutting insert 3, the cutting edges 5A, 5B form a mutual angle, which in FIG. 3 has been designated $\alpha$. Within the scope of the invention, it applies that $10°<\alpha<20°$. Preferably, the angle $\alpha$ is about 15°. As is seen in FIG. 3, the cutting edge 5A facing the observer, i.e., the active cutting edge, generates a width W while the cutting edge 5B facing away from the observer, i.e., the inactive culling edge, a width W'. Since W>W', the inactive cutting edge 5B will lie inside the bordering surfaces of the groove generated by the active cutting edge 5A. In this connection, it should be pointed out that the respective "active" width of the cutting edges 5A, 5B in the normal case is in the order of 5 mm. The difference W-W' will thereby only be some hundredths of a millimeter at the above-mentioned size of the angle α.

The cutting insert 3 also has ridges 10 on two opposite longitudinal sides. When the cutting insert 3 is received in the holder 1, the ridges 10 are received in a groove 4, 8 each. The cross-sectional shape of the ridges 10 is adapted to the cross-sectional shape of the grooves 4, 8. As is seen in FIG. 2, the ridges 10 are equally long, which is an advantage as for obtaining a stable clamping of the cutting insert 3 in the holder 1. Since the ridges 10 extend along the greater part of the cutting insert 3, the length along which engagement takes place between the holder 1 and the cutting insert 3 is relatively speaking long, which obviously is an advantage as for the stability of the clamping of the cutting insert 3 in the holder 1.

In FIG. 3, the height of the cutting insert 3, i.e., the distance between the portions of the ridges 10 situated farthest out, is designated H. The height H is measured along the center line C-C of the cutting insert 3. In the embodiment of the cutting insert 3 shown in FIG. 3, the cutting edges 5A, 5B have a common point of intersection S in the middle of the cutting edges 5A, 5B in the end view shown in FIG. 3. The distance between the point of intersection S and the outermost portion of the lower ridge 10, along the center line C-C, is in FIG. 3 designated H1. In the embodiment illustrated, 2H1=H. However, within the scope of the invention, it is conceivable that H1 is greater in relation to H. i.e., the cutting edge 5A is displaced upward in FIG. 3 and the cutting edge 5B is displaced downward in FIG. 3. In such an embodiment, no common point of intersection S is generated on the center line C-C. H1 is then the distance between the center of the cutting edge 5A and the outermost portion of the ridge 10, measured along the center line C-C. Within the scope of the invention, H1 may be 50-70% of H.

The holder 1, which is intended to hold the cutting insert described above, comprises plane-parallel first 1A and second 1B side surfaces. The holder has at least one insert pocket comprising first 4 and second 8 engagement members consisting of grooves or ridges. The first engagement member 4 has, when the same is seen in the cross-section according to FIG. 1B, a minimum or maximum point provided closer to the second side surface 1B than the first to side surface 1A. The second engagement member 8 has a minimum or maximum point provided closer to the first side surface 1A than the second side surface 1B. A line C1-C1, which intersects said minimum or maximum points forms an angle that is in the interval of 10°<α<20° in relation to a plane being parallel with the side surfaces 1A, 1B.

The tool according to the present invention is primarily intended for parting, especially radial parting or grooving. However, the tool according to the present invention may also be used for axial grooving. If the cutting insert according to the present invention should be used for axial grooving, a modified holder is normally required, i.e., a holder blade being curved in an end view.

In the embodiment described above, the cutting insert is provided with ridges 10 while the holder 1 is provided with grooves 4, 8 for receipt of the ridges 10. However, within the scope of the present invention, it is conceivable that the cutting insert is provided with grooves and the holder is provided with ridges.

The disclosures in Swedish patent application No. 0702674-3, from which this application claims priority, are incorporated herein by reference.

The invention claimed is:

1. Cutting insert for chip removing machining, the cutting insert comprising an elongate center part, cutting edges being arranged at the opposite ends of the center part, the cutting insert being provided with engagement members along two longitudinal, opposite sides, the cutting edges forming, in an end view of the cutting insert, a mutual angle (α), wherein rake faces associated with the respective cutting edge are facing opposite directions in the vertical direction of the cutting insert, and the angle (α) between the cutting edges is in the interval of 10°<α<20°, a distance (H1) being measured between the intersection of the cutting edge with a center line (C1-C1) of the cutting insert and the outermost portion of the lower to engagement member and in that in an end view of the cutting insert, the ratio between the distance (H1) and the height (H) of the cutting insert is the following: 0.5H≦H1≦0.7H, the distance (H1) and the height being measured along a center line (C1-C1) of the cutting insert.

2. Cutting insert according to claim 1, wherein the mutual angle (α) is in the order of 15°.

3. Cutting insert according to claim 2, wherein, in an end view of the cutting insert, the cutting edges have a common point of intersection (S) with a center line (C1-C1) of the cutting insert.

4. Cutting insert according to claim 1, wherein, in an end view of the cutting insert, the cutting edges have a common point of intersection (S) with a center line (C1-C1) of the cutting insert.

5. Tool for chip removing machining, the tool comprising a disc-shaped holder as well as a cutting insert received in the holder, the cutting insert comprising an elongate center part, cutting edges being arranged at the opposite ends of the center part, the cutting insert being provided with engagement members along two longitudinal, opposite sides, the cutting edges forming, in an end view of the cutting insert, a mutual angle (α), wherein the rake faces associated with the respective cutting edge are facing the opposite direction in the vertical direction of the cutting insert, the angle (α) between the cutting edges is in the interval of 10°<α<20°, a distance (H1) being measured between the intersection of the cutting edge with a center line (C1-C1) of the cutting insert and the outermost portion of the lower engagement member and in an end view of the cutting insert the ratio between the distance (H1) and the height (H) of the cutting insert is the following: 0.5H≦H1≦0.7H, the distance (H1) and the height being measured along a center line (C-C) of the cutting insert.

6. Tool according to claim 5, wherein the mutual angle (α) is in the order of 15°.

7. Tool according to claim 6, wherein in an end view of the cutting insert, the cutting edges have a common point of intersection (S) with a center line (C1-C1) of the cutting insert.

8. Tool according to claim 5, wherein in an end view of the cutting insert, the cutting edges have a common point of intersection (S) with a center line (C1-C1) of the cutting insert.

* * * * *